United States Patent [19]

Nelson et al.

[11] 4,355,969
[45] Oct. 26, 1982

[54] ELECTRICALLY CHARGED, EMULSIFIED CARRIER-FUEL PARTICLE COMBUSTION

[75] Inventors: Kenneth L. Nelson, Traverse City, Mich.; David FitzGerald, North Hampton, Pa.

[73] Assignee: FND Company, Traverse City, Mich.

[21] Appl. No.: 154,390

[22] Filed: May 29, 1980

[51] Int. Cl.³ .................. F23J 7/00; F02M 7/00; F02G 3/00; C10L 1/32
[52] U.S. Cl. .................................. 431/4; 44/51; 123/536; 60/39.56; 431/2
[58] Field of Search .......... 126/538, 3, 536, DIG. 12; 431/2, 4, 11; 60/39.53, 39.55, 39.56, 39.46 R, 39.46 S, 39.59; 44/50, 51; 123/1 A, 536, 538

[56] References Cited
U.S. PATENT DOCUMENTS 3,766,942 10/1973 Delatronchete ................ 431/4
4,005,683 2/1977 Whitt ................................ 123/536
4,030,455 6/1977 Van Eeck ........................ 123/1 A Primary Examiner—Samuel Scott
Assistant Examiner—G. Anderson
Attorney, Agent, or Firm—Price, Heneveld, Huizenga and Cooper

[57] ABSTRACT

Improving the combustion of a fuel by providing negatively charged ions in water to molecularly excite the water, creating an emulsion composed of tiny droplets of the ion charged water coated with fuel oil, and introducing the emulsion of excited fuel coated water droplets with oxidizing gas into a combustion zone.

4 Claims, 1 Drawing Figure

ELECTRICALLY CHARGED, EMULSIFIED CARRIER-FUEL PARTICLE COMBUSTION

BACKGROUND OF THE INVENTION

This invention relates to fuel combustion and more particularly to improved combustion of a liquid fuel, typically fuel oil.

Increasing the efficiency of combustion of fuel oil by introducing the oil to the combustion chamber in small droplets is known art. This increase is believed to result because of the greater surface area of fuel exposed to the oxidizing gas. Still, there is a practical limit in size to which the droplets can be economically reduced, typically about 50 to 100 microns or so. The heavier the grade of fuel oil, the larger this droplet size tends to be.

It is also known that injection of water vapor into the combustion chamber effects some increase in heat output. Prior documents have taught that fuel combustion efficiency is improved by creating an emulsion of the fuel and water prior to injection thereof into the combustion chamber. Such involves addition of considerable quantities of moisture to the fuel.

Still, in typical boilers and other combustion equipment, incomplete combustion does occur with some of the fuel being converted to oil coke rather than completely combusted. The heavier the grade of fuel oil, the greater is this tendency. This presents stack discharge problems, costly maintenance, inefficient fuel conversion, and heavy demand on more costly grades of fuel.

SUMMARY OF THE INVENTION

An object of this invention is to improve combustion of liquid fuels, typically fuel oil, by introducing into the combustion chamber a molecularly excited emulsion composed of fuel oil coated on ionically charged water droplets. The ionic charge is believed to reduce the surface tension at the interface between the water and oil of the droplet. This lowering of surface tension considerably lessens the added energy necessary to explode the emulsion droplets in the combustion zone to submicron size particles to be combusted, thereby increasing net energy output. Further, by causing the ionic charge to be negative, the flame of efficiency is also improved for reasons not fully understood.

Therefore, this invention provides improved fuel combustion efficiency using a molecularly excited fuel and water emulsion bearing a negative ionic charge as introduced to the combustion chamber.

Another object of this invention is to supply a fuel and water emulsion having a lowered surface tension at the water-fuel interface without the necessity of surfactant additives. The energy input necessary to cause emulsion droplet explosion into submicron size fuel particles is lessened, resulting in more rapid combustion, more complete combustion, and higher net energy output.

These and other objects, features, and advantages of the invention will be apparent from the detailed description to follow.

BRIEF DESCRIPTION OF THE DRAWING

The FIGURE is a schematic diagram showing one type of system for practicing the invention herein.

DESCRIPTION OF THE PREFERRED EMBODIMENT

Figure 1:
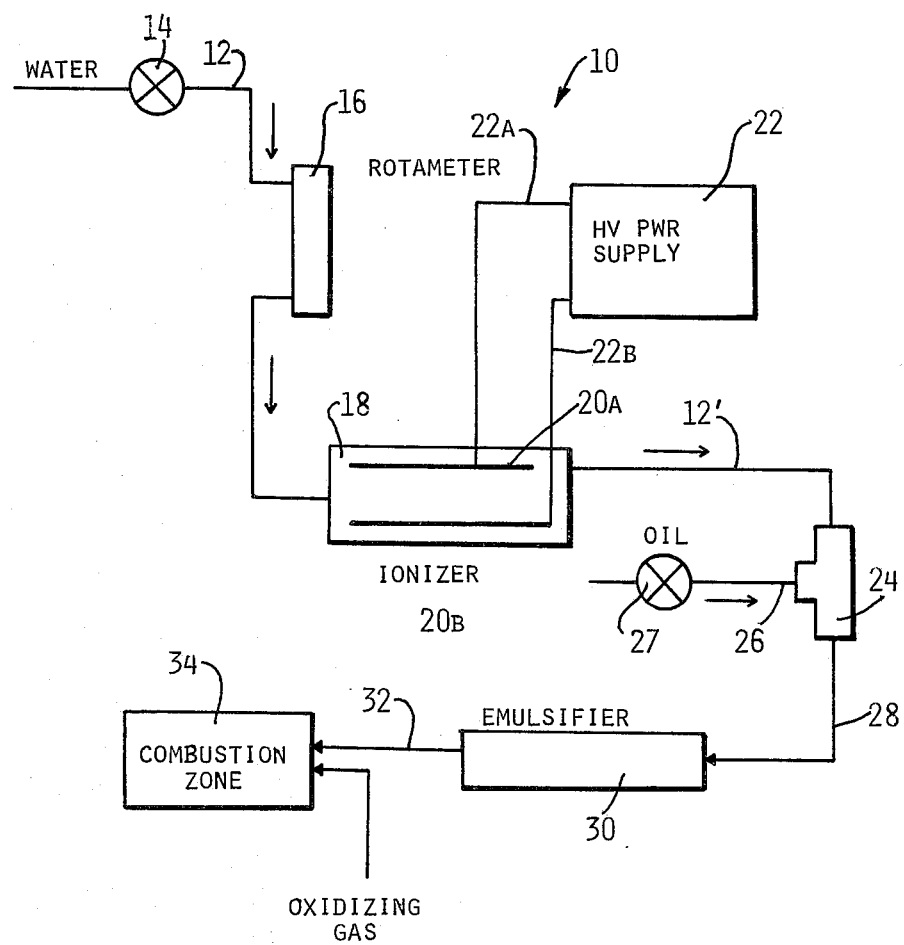

Referring to the drawing FIGURE, the system 10 there depicted includes a water inlet conduit 12 from a suitable source (not shown), through a control valve 14 and a flow meter such as a rotameter 16 downstream of valve 14, the water flowing through an excitation unit 18. In the embodiment depicted, unit 18 comprises an ionizer having a pair of insulated, electrically charged plates 20a and 22b spaced from each other within the housing, the water flow being basically between the plates through the housing and then discharged through conduit or duct 12' for causing molecular excitation of the water by providing negatively charged large ions, basically hydroxyl ions. The electrical charge on plates 20a and 20b is supplied from a high voltage power supply 22 electrically connected by leads 22a and 22b to the plates. A small volume of the outflowing water bearing the charged ions is then combined in mixing chamber 24 with a much larger proportion of oil fuel flowing to mixing chamber 24 through duct 26 and control valve 27 from a suitable source of fuel (not shown). The ratio of charged water to fuel oil is about five percent.

The mixed oil and ion-bearing water are conducted via duct 28 to an emulsifier unit 30. The emulsion of charged water droplets coated with the oil fuel is then conveyed through duct 32 to the combustion zone within a combustion chamber 34 simultaneously with introduction of an oxidizing gas such as air or oxygen for combustion.

When the emulsion is formed of the oil and the water containing the heavy negative hydroxyl ions, oil coats the tiny resultant droplets bearing the negative charge. Such charge is believed to cause the interfacial surface tension to be relatively low. Then when the oil coated and charged, i.e. excited water droplets are injected through a dispersing nozzle into the combustible chamber, there is a relatively small amount of energy required to heat the water droplets to the point where the expansion force thereof will overcome the interfacial surface tension and cause the droplet to explode and burst the surrounding oil into submicron size particles. These particles are capable of quick, efficient combustion. In addition to this negative ion concentration causing enhanced, violent disruption of the droplets, such negative ion concentration is also believed to directly improve combustion, shift radial flame velocity, and increase peak temperature. The amount of electrical energy required to be added from the high voltage source to cause effective ionization in the water is small, but creates a significant increase in energy production by accelerating the combustion, decreasing the time required for combustion, and increasing completeness of combustion. Pollutant emissions are thereby decreased.

The negative charge on the water droplets should be protected against neutralization during flow from the ionizer to the combustion chamber. To do this, the conduit should have a triboelectric character of status causing maintenance or increase of the negative potential. The negative charge is electrically insulated.

The high voltage power supply 22 typically will have a voltage potential of about 3 to 9 KV, creating highly charged hydroxyl ions in the molecularly excited output water. The particular voltage applied can vary considerably with the type of installation, the ratio of water to oil selected, the grade of the oil, and the type of combustion unit employed, such being readily determined empirically.

The plate arrangement just described is about the simplest apparatus for molecularly activating the water. Alternative apparatuses can be employed, however. Specifically, water can be electrostatically charged by inducing turbulent flow into the water as through a pipe section wherein electrically isolated wires having an electrical charge thereon, are supported parallel to the flow. Or, the water can be electrostatically charged by flowing a stream of water through an electrified spray nozzle wherein a high electrical gradient of say, about 3–9 KV, is maintained between the contact electrode and the stream of water.

The emulsifier may be any of various units. The emulsifying apparatus considered most suitable operates upon the preblended fuel oil and electrostatically charged water by causing a shearing action between liquid layers so as to create a stable emulsion. Emulsifier units presently available include those known as low pressure drop, motionless mixer emulsifiers as marketed for example by Charles Ross & Son Co. of Long Island, N.Y., or those known as hydrodynamic shear emulsifiers as shown for example in U.S. Pat. No. 3,531,406. Such emulsifiers, as is known, create an emulsion of tiny droplets of water coated with oil, with typical droplet size being in the range of 1 to 20 microns.

In the process of this present invention, with the oil coated on the molecularly excited water droplets, there is an increase of flame propagation, yet with less than two percent water added. It adds an ion vapor carrier for oil to coat onto, such causing the droplets to readily explode to submicron size particles. The tiny oil particles are quickly and efficiently combusted. The very small amount of energy input controlling the large degree of energy output is somewhat like the effect of an electrical grid in an electron tube. The controlled decrease in time of combustion and increase in completeness of combustion is achieved by disturbing the process of combustion with the introduction of the highly negatively charged heavy ions. Although the true scientific explanation is not completely understood, the results are considered to be due to (1) increased oxidation rate by admitting ions having such highly charged condition that they promote oxidation or (2) alteration of ionization or breakdown of the fuel, or (3) lowering the ignition point of the $CH_2$ radical or other radicals and if so, such could be the result of (1) and/or (2) above. This gives more time in the combustion chamber to burn more carbon and cause more hydroxyl reactions.

Those in the art, after studying the above disclosure, will likely envision variations of the invention other than those specifically described. The invention is intended to be limited only by the scope of the appended claims rather than to the exemplary embodiments of the concept.

The embodiments of the invention in which an exclusion property or privilege is claimed are defined as follows:

1. A method of improving the combustion process between a fuel and an oxidizing gas in a combustion zone comprising the steps of creating negatively charged ions in water forming an emulsion of charged water and an oil fuel and introducing said emulsion as oil coated droplets, and an oxidizing gas into the combustion zone, heating the sroplets to cause said droplets to explode and burst the oil fuel into dispersed oil fuel particles, and combusting the dispjersed oil fuel particles.

2. The method of claim 1 wherein said negative electrical charge application is electrostatic.

3. The method of claim 2 including the step of protecting the negative ionic charge on the water droplets from being neutralized or converted to a positive charge between formation and explosion.

4. A method of combustion of a fuel with an oxidizing gjas in a combustion zone comprising effecting negatively charged ions in water, creating an emulsion of the ion-bearing water and oil fuel to form tiny, ion-bearing water droplets coated with oil film, introducing this emulsion into the combustion zone while maintaining the negative ionic charge, and also introducing the oxidizing gas to the combustion zone, applying heat to the droplets to cause the droplets to explode and burst the surrounding oil film to particles, and then combusting these oil particles.

* * * * *